US006460383B1

(12) United States Patent
Wadsworth, Jr.

(10) Patent No.: US 6,460,383 B1
(45) Date of Patent: Oct. 8, 2002

(54) VALVE LOCKING DEVICE

(76) Inventor: Michael W. Wadsworth, Jr., 6411 Coghill Dr., Pasadena, TX (US) 77505

( * ) Notice: Subject to any disclaimer, the term of this patent is extended or adjusted under 35 U.S.C. 154(b) by 0 days.

(21) Appl. No.: 09/840,781

(22) Filed: Apr. 25, 2001

(51) Int. Cl.$^7$ .......................... F16K 35/00; G05G 35/00
(52) U.S. Cl. ........................... 70/177; 70/180; 137/385
(58) Field of Search .......................... 70/177, 180, 212, 70/211, 175, 176, 19, 26, 37, 38 A, 53, 202, 203; 137/385, 383

(56) References Cited

U.S. PATENT DOCUMENTS

| | | | | |
|---|---|---|---|---|
| 1,228,123 A | * | 5/1917 | McDermott | 70/212 |
| 3,532,111 A | * | 10/1970 | Hansen et al. | 137/385 |
| 4,317,346 A | * | 3/1982 | Gutman | 70/238 |
| 4,681,137 A | * | 7/1987 | Paris, Sr. | 137/385 |
| 4,872,327 A | * | 10/1989 | Wagner | 70/175 |
| 5,560,233 A | * | 10/1996 | Watkins | 70/177 |
| 5,806,555 A | * | 9/1998 | Magno, Jr. | 137/385 |
| 6,164,318 A | * | 12/2000 | Dixon | 137/385 |
| 6,170,306 B1 | * | 1/2002 | Kitley et al. | 70/178 |
| 6,360,571 B1 | * | 3/2002 | O'Neal | 70/226 |

* cited by examiner

*Primary Examiner*—Anthony Knight
*Assistant Examiner*—John B. Walsh
(74) *Attorney, Agent, or Firm*—Bill B. Berryhill

(57) ABSTRACT

A locking device for preventing movement of the operating handle of a valve comprising a U-shaped rod member engageable with a portion of the valve and having a curved proximal portion from which extends parallel portions for disposition on opposite sides of the valve handle to prevent movement thereof. First and second pivotally connected elongated arm members are positionable on opposite sides of the U-shaped member so that when they are brought together the U-shaped rod member is confined thereby to prevent said movement of said valve handle.

11 Claims, 3 Drawing Sheets the parallel portions 14, 15 of the rod member 10 are provided with a series of uniformly spaced corresponding holes 18, 19, the axes of which are perpendicular to the axes of the parallel portions 14, 15 of the rod member 10. As shown in FIG. 1, the rod member 10 is insertable through a portion of the valve V so that the proximal portion 13 thereof is substantially interengageable with a portion of the valve
VALVE LOCKING DEVICE

BACKGROUND OF THE INVENTION

1. Field of the Invention

The present invention relates to valve locking devices. More specifically, the present invention pertains to a device for preventing movement of the operating handle of a fluid valve.

2. Description of the Prior Art

There are various reasons for preventing the opening or closing of a fluid valve. Utility companies may lock a water or gas valve closed to terminate service of a delinquent customer or to prevent flow of water and/or gas into a vacant house. More importantly, fluid valves are frequently locked open or closed in certain industrial operations for safety purposes. For example it may be extremely hazardous to interrupt fluid flow through a valve in a chemical process or in a valve supplying energy to machinery or equipment. In many cases, particularly during maintenance procedures, it may also be important to lock a fluid valve closed to prevent operation of a process, equipment or machinery during such maintenance operations. There are many other reasons for locking a valve opened or closed.

A number of devices have been developed for locking a valve in a certain position. A few examples are shown in U.S. Pat. Nos. 4,872,327; 5,806,555 and 6,164,318. These devices vary in complexity and operations, depending upon the specific use for which they were designed.

It is of course most important that valve locking devices be effective and tamper proof. It would also be desirable if they were easy to use, inexpensive and trouble free. The search continues for effective locking devices which prevent movement of the operating handle of the fluid valve which is effective, tamper proof and easily used. The present invention seeks to provide these characteristics.

SUMMARY OF THE PRESENT INVENTION

The present invention comprises a locking device for preventing movement of the operating handle of a fluid valve. The device includes a U-shaped rod member having a curved proximal portion from which extends parallel portions terminating in a pair of spaced apart distal ends. The rod member is insertable through some portion of the valve so that the proximal portion thereof is substantially interengageable therewith, the distal ends of the rod member extending on opposite sides of the valve handle to prevent movement thereof.

The device also includes first and second elongated arm members corresponding proximal ends of which are pivotally connected. Each of the elongated arm members is positionable on opposite sides of the U-shaped rod member so that when distal ends of the arm member are brought together the U-shaped member is confined thereby to prevent movement of the valve handle. The parallel portions of the arm members are provided with cooperating apertures which, when the distal ends of the arm members are brought together, are aligned for engagement with the shackle of a padlock for securing the arm members to the U-shaped rod member in their confined relationship therewith.

In preferred embodiments, each of the parallel portions of the rod member are provided with uniformly spaced corresponding holes whose axes are perpendicular to the axes of the parallel portions of the rod member. At least one of the arm members is provided with a pin member which is engageable with a selected one of the uniformly spaced holes of the rod member when the distal ends of the arm members are brought together, to prevent movement of the rod member from its enclosed relationship with the arm members. The other of the arm members may be penetrated by a corresponding pin hole. The pin member of one arm member is then extendable through a select one of the uniformly spaced rod member holes into the pin hole, providing additional tamper proof characteristics.

The locking device of the present invention is extremely effective in preventing movement of the operating handle of a valve. It is easily installed and removed. Most importantly, it is substantially tamper proof and very effective in locking a valve in its closed or opened position. Many objects and advantages of the invention will be apparent from reading the description which follows in conjunction with the accompanying drawings.

DESCRIPTION OF A PREFERRED EMBODIMENT OF THE INVENTION

Figure 1:
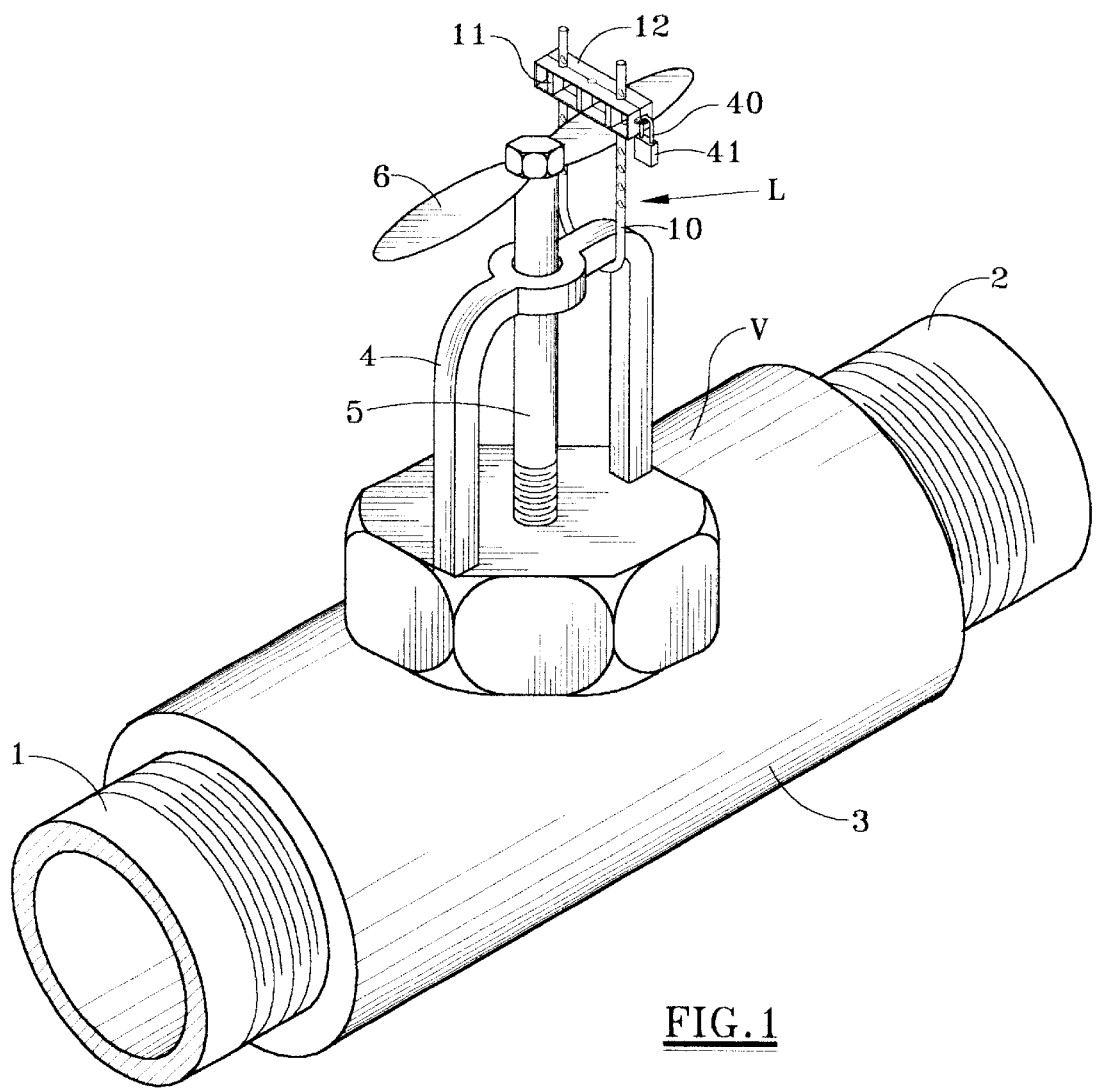
FIG. 1 is a pictorial illustration of a handle operated fluid valve showing the operating handle of the valve locked in position by a locking device according to a preferred embodiment of the invention.

Referring first to FIG. 1 there is shown a fluid valve V connected to pipe members 1 and 2 to provide flow therebetween when the valve is in the open position. Of course, when the valve is in the closed position, fluid flow is prevented through the piping 1, 2. The valve V could be any type of valve. For illustrative purposes only, the valve V is shown with a body 3, a valve bonnet or yoke 4, a valve stem 5 and an operating handle 6. The valve stem 5 extends into the valve body 3 where it is connected to a closure member (not shown). Rotation of the valve stem 5 by the handle member 6 effects movement of the closure member (not shown) between closed and opened positions. For purposes of illustration it makes no difference whether the valve handle 6 is in the opened or closed position. It is only important to note that valve handle 6 is to be prevented from movement by the locking device L of the present invention.

Figure 2:
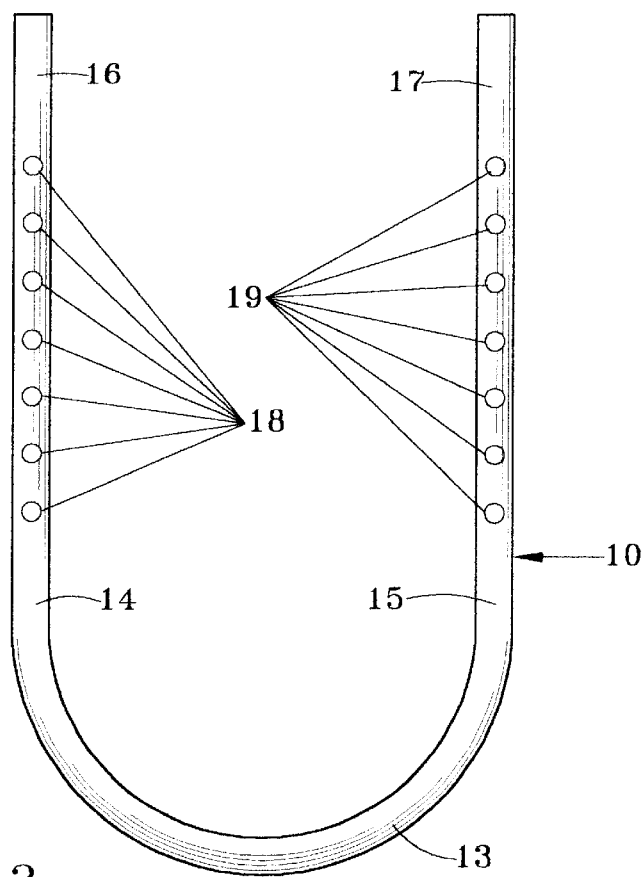
FIG. 2 is a side view of a U-shaped rod member which is a component of the locking device of the present invention, according to a preferred embodiment thereof.

The locking device L comprises three major components: a U-shaped rod member 10, a first elongated arm member 11 and a second elongated arm member 12. As best seen in FIG. 2, the U-shaped rod member 10 has a curved proximal portion 13 from which extends parallel portions 14 and 15 terminating in a pair of spaced apart distal ends 16 and 17. The parallel portions 14, 15 of the rod member 10 are provided with a series of uniformly spaced corresponding holes 18, 19, the axes of which are perpendicular to the axes of the parallel portions 14, 15 of the rod member 10. As shown in FIG. 1, the rod member 10 is insertable through a portion of the valve V so that the proximal portion 13 thereof is substantially interengageable with a portion of the valve V and the parallel portions 14, 15 and distal ends 16, 17 of the rod member are extendable on opposite sides of the valve handle 6 to prevent movement thereof.

Figure 3:
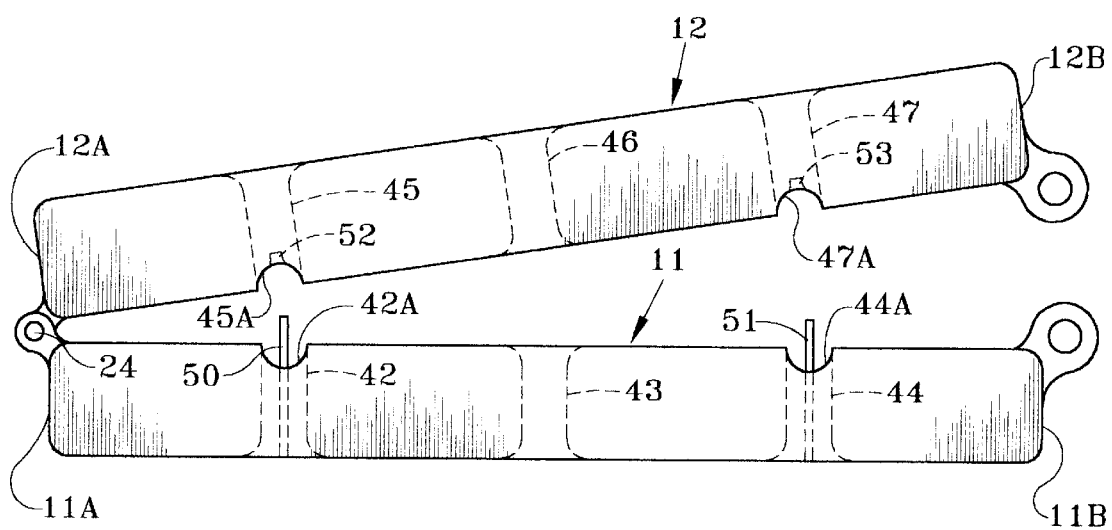
FIG. 3 is a longitudinal edge view of a pair of connected arm members which form components of the locking device of the present invention, according to a preferred embodiment thereof.
Figure 4:
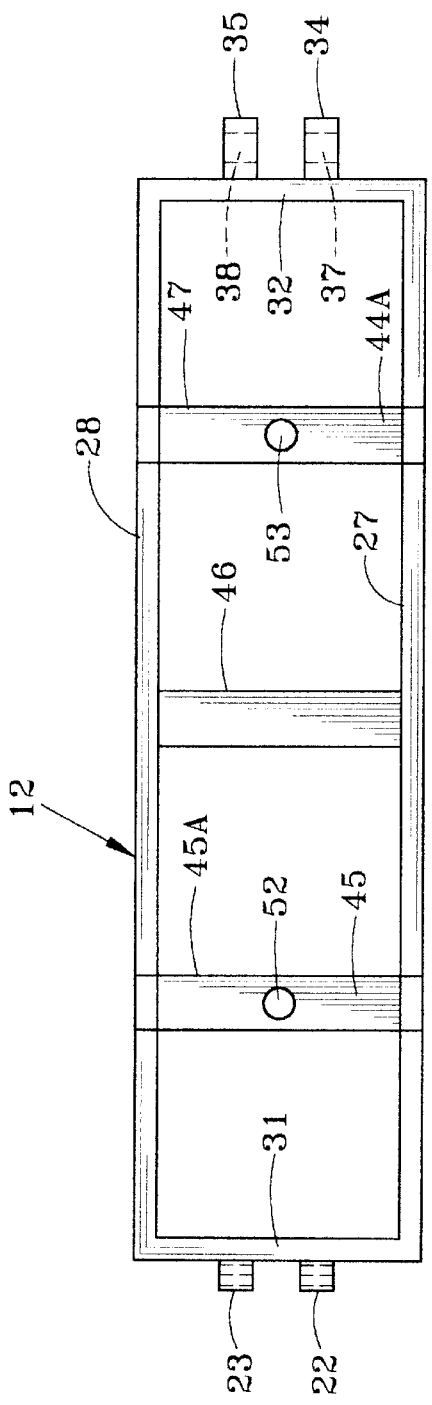
FIG. 4 is a longitudinal side view of one of the arm members of the pair of arm members shown in FIG. 3.
Figure 5:
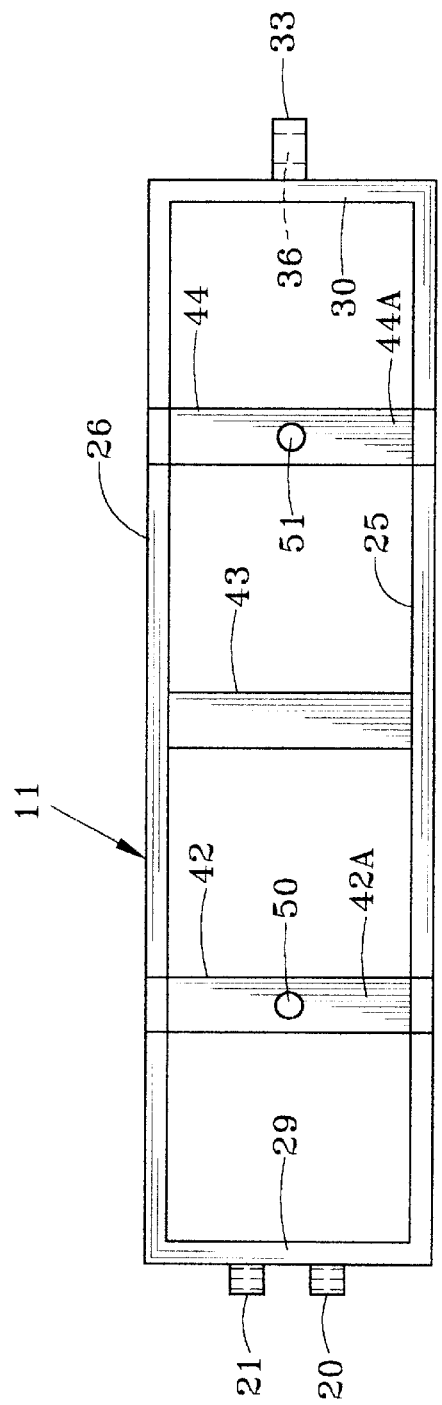
FIG. 5 is a longitudinal side view of the other of the arm members shown in FIG. 3.

As best seen in FIGS. 3, 4 and 5 the first and second arm members 11 and 12 may be described as having proximal ends 11a, 12a and distal ends 11b, 12b. The proximal ends of each of the arm members may be provided with tubular extensions 20, 21, 22, 23 which are so positioned that when engaged in coaxially aligned relationship form a continuous tube through which a pin 24 (see FIG. 3) may be inserted so that the arm members 11 and 12 are pivotally connected.

In the exemplary embodiment, each of the arm members 11, 12 comprises a pair of parallel side supports 25, 26 and 27, 28 joined at opposite ends by a pair of end supports 29, 30 and 31, 32 which are perpendicular thereto. The end supports 29, 31 at the proximal ends of the arms 11 and 12 support the tubular members 20, 21 and 22, 23. The end supports 30 and 32 at the proximal ends of the arms support extensions 33, 34, 35 which have cooperating apertures 36, 37, 38 which, when the distal ends of the arm members are brought together (such as shown in FIG. 1), are in mutual registration allowing engagement with the shackle 40 of a padlock 41 thereby securing the arm members 11 and 12 in a mutually locked relationship.

In a preferred embodiment each of the arm members 11 and 12 are provided with cross supports 42, 43, 44 and 45, 46, 47 which connect the side members 25, 26 and 27, 28 respectively. A pair of the cross supports, 42, 44 for arm 11 and 45, 47 for arm 12 are spaced apart by substantially the same distance as the distance between the parallel portions 14, 15 and distal ends 16, 17 of the U-shaped rod member 10. Each of these particular cross supports 42, 44 and 45, 47 and the adjoining edges of the side members 25, 26 and 27, 28 are provided with elongated semi-cylindrical recesses 42a, 44a, and 45a, 47a so that when the distal ends 11b, 12b of the arm members are brought together, such as shown in FIG. 1, the cross supports 42, 45 and 44, 47 of each arm member 11 and 12 cooperate to surround each of the pair of parallel portions 14, 15 and distal ends 16, 17 of the rod member 10 in a close fitting cylindrical enclosure.

In the exemplary embodiment, pin members 50, 51 extend from the semi-cylindrical recesses 42a and 44a of one arm member 11 and the semi-cylindrical recesses 45a and 47a of the other arm member 12 are penetrated by pin holes 52 and 53. When the distal ends 11b and 12b of the arm members 11 and 12 are brought together, as shown in FIG. 1, and the recesses 42a, 45a and 44a, 47a surround the rod member 13, as shown in FIG. 1, in close fitting cylindrical enclosures, the pin members 50 and 51 are aligned with selected ones of the rod member holes 18, 19, extending therethrough and into the pin holes 52, 53 of the other arm member 12. This contributes to the tamper proof characteristics of the device.

To install the locking device L the U-shaped rod member 10, separated from the arm members 11, 12, is inserted through some portion of the valve V so that the parallel portions 14, 15 of the rod member 10 extend upwardly on opposite sides of the valve handle 6, the valve V being in an open or closed position. Then the connected arms 11, 12, with distal ends 11b and 12b spread apart, even more than in FIG. 3, are placed on opposite sides of the rod 10. Then the distal ends 11b and 12b are brought together above the valve handle 6. As this is done, the parallel portions 14, 15 of the rod member 10 are disposed in corresponding recesses 42a, 45a and 44a, 47a of the arm members 11 and 12 and the pins 50, 51 are inserted through selected ones of the holes 18, 19 of the rod member 10. The arm members 11, 12 are brought completely together, in parallel relationship, as shown in FIG. 1. When this is accomplished, the rod member 10 and arm members 11, 12 are in a fixed relationship. The shackle 40 of the padlock 41 can then be engaged with the apertures 36, 37, 38 securing the device L and locking the valve V in position.

Of course, the valve V may be freed for operation by removing the padlock 41 and spreading the arm members 11, 12 apart to free the rod member 10 for removal. The locking device L can again be used to lock the V in the same or another position.

The locking device of the present invention is easy to use and very effective. It would be relatively inexpensive compared to other more complex devices.

A single embodiment of the locking device has been described herein. However, many variations of the invention can be made by those skilled in the art without departing from the spirit of the invention. Accordingly, it is intended that the scope of the invention be limited only by the claims which follow.

What is claimed is:

1. A locking device for preventing movement of the operating handle of a valve, said device comprising:

a U-shaped rod member having a curved proximal portion from which extends parallel portions terminating in a pair of spaced apart distal ends, said rod member being insertable through a portion of said valve so that said proximal portion is substantially interengageable therewith and said parallel portions thereof extend on opposite sides of said valve handle to prevent movement thereof; and first and second elongated arm members having corresponding proximal ends of which are pivotally connected, each of said elongated arm members being positionable on opposite sides of said U-shaped member so that when distal ends of said arm members are brought together said U-shaped member is confined thereby to prevent said movement of said valve handle; said distal ends of said arm members being provided with cooperating apertures which, when said distal ends of said arm members are brought together, are aligned and engageable with the shackle of a padlock for securing said arm members to said U-shaped rod members in said confined relationship therewith.

2. The valve handle locking device of claim 1 in which said first arm member is provided with spaced apart recesses which face toward corresponding spaced apart recesses of said second arm member, said recesses of each arm member cooperating, when said distal ends of said arm members are brought together, to surround each of said pair of parallel portions of said rod member in an enclosed relationship.

3. The valve handle locking device of claim 2 in which each of said parallel portions of said rod member are provided with uniformly spaced corresponding holes, the axes of which are perpendicular to the axes of said parallel portions of said rod member, at least one of said arm members having a pin member extending from at least one of its spaced apart recesses, said pin member being engageable with a selected one of said uniformly spaced holes of said rod member, when said distal ends of said arm members are brought together, to prevent axial movement of said parallel portions of said rod member relative to said surrounding recesses.

4. The valve handle locking device of claim 3 in which at least one of the spaced apart recesses of the other of said arm members is penetrated by a pin hole, said pin member of said one arm member being extendable through said selected one of said uniformly spaced rod member holes into said pin hole.

5. The valve handle locking device of claim 3 in which each of said arm members comprises a pair of parallel side supports joined at opposite ends by a pair of end supports perpendicular thereto, the end supports at said proximal ends of said arm members being provided with cooperating means by which said arm members are pivotally connected, the end supports at said distal ends of said arm members being provided with said cooperating apertures which, when said distal ends of said arm members are brought together, are in mutual registration allowing engagement with said shackle of a padlock thereby securing said arm members to said U-shaped rod member in said confined relationship therewith.

6. The valve handle locking device of claim 5 in which each of said arm members comprises a pair of cross supports connecting said pair of side supports, the distance between said cross supports being substantially the same as the distance between said pair of spaced apart parallel portions of said U-shaped rod member.

7. The valve handle locking device of claim 6 in which each of the said cross supports is provided with a semi-cylindrical recess throughout the length thereof so that when said distal ends of said arm members are brought together, the cross supports of each arm member cooperate to surround each of said pair of parallel portions of said rod member in a close fitting cylindrical enclosure.

8. The valve handle locking device of claim 7 in which each of said parallel portions of said rod member are provided with uniformly spaced corresponding holes, the axes of which are perpendicular to the axes of said parallel portions of said rod member, at least one of said arm members having a pin member extending from at least one of said semi-cylindrical recesses which is engageable with a selected one of said uniformly spaced holes of said rod member, when said distal ends of said arm members are brought together, to prevent axial movement of said parallel portions of said rod member relative to said close fitting cylindrical enclosure.

9. The valve handle locking device of claim 8 in which the semi-cylindrical recess of at least one of said cross supports of said other arm is penetrated by a pin hole, said pin member of said one arm member being extendable through said selected one of said uniformly spaced rod member holes into said pin hole.

10. The valve handle locking device of claim 6 in which each of said parallel portions of said rod member are provided with uniformly spaced corresponding holes, the axes of which are perpendicular to the axes of said parallel portions of said rod member, at least one of said arm members having a pin member extending from at least one of said cross supports which is engageable with a selected one of said uniformly spaced holes of said rod member, when said distal ends of said arm members are brought together, to prevent movement of said rod member from said confirmed relationship with said arm members.

11. The valve handle locking device of claim 10 in which at least one of said cross supports of said other arm is penetrated by a pin hole, said pin member of said one arm member being extendable through said selected one of said uniformly spaced rod member holes into said pin hole.

* * * * *